Feb. 25, 1936. B. A. HANNEWALD ET AL 2,031,708
APPARATUS FOR FILLING BAGS
Filed Jan. 3, 1933   3 Sheets-Sheet 1
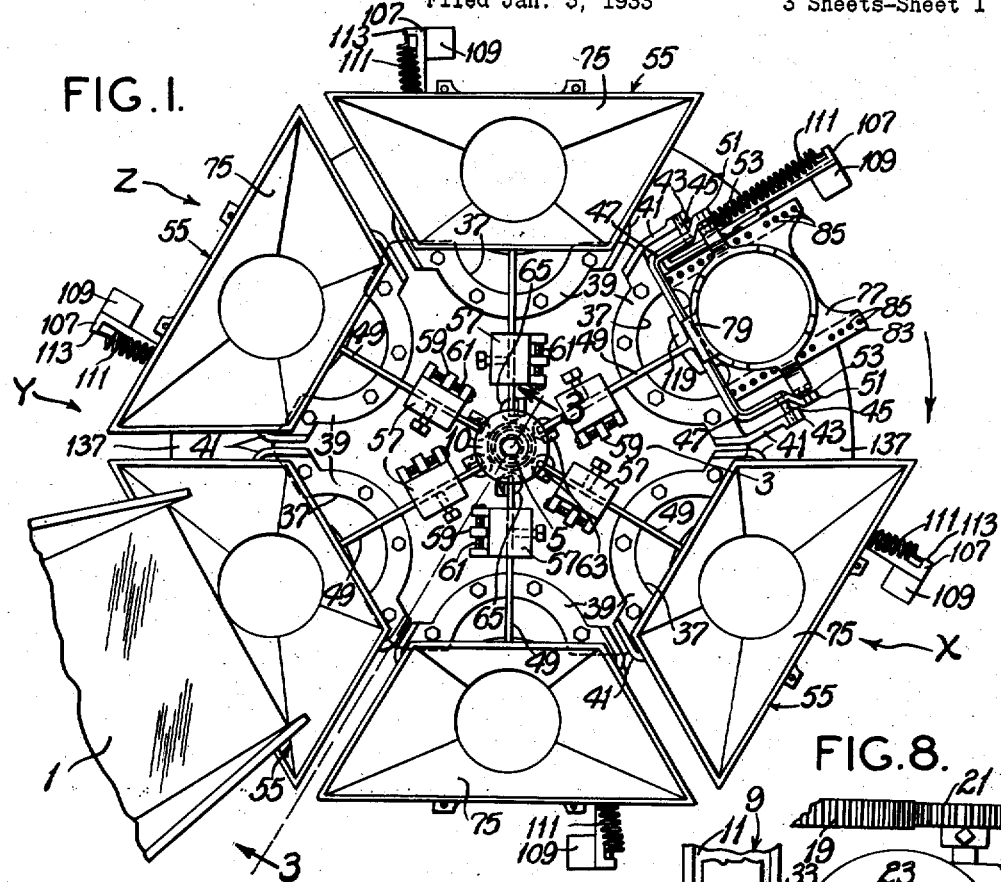
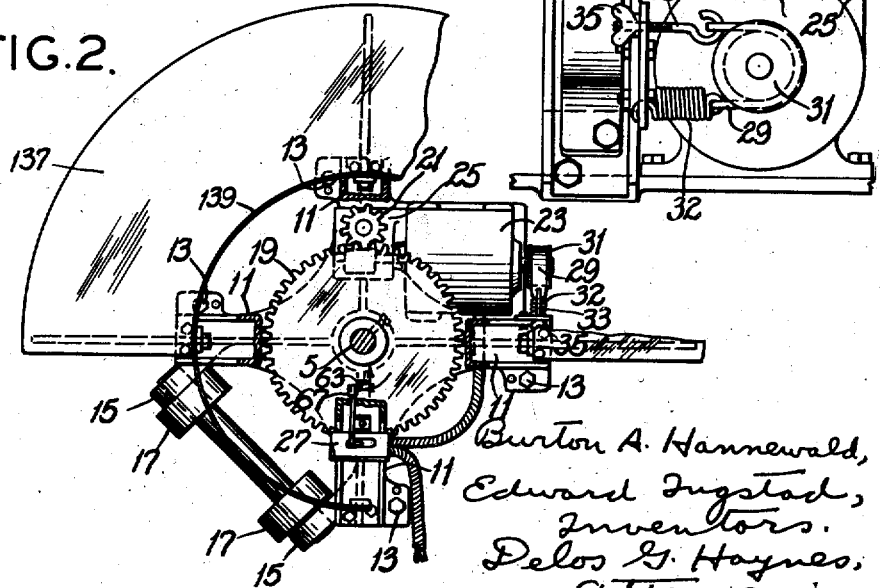

Feb. 25, 1936. B. A. HANNEWALD ET AL 2,031,708
APPARATUS FOR FILLING BAGS
Filed Jan. 3, 1933 3 Sheets-Sheet 2
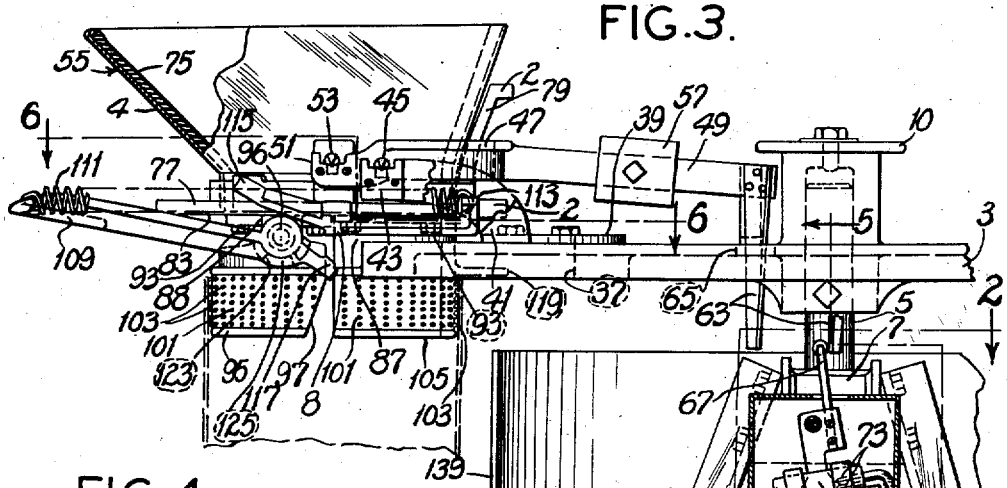
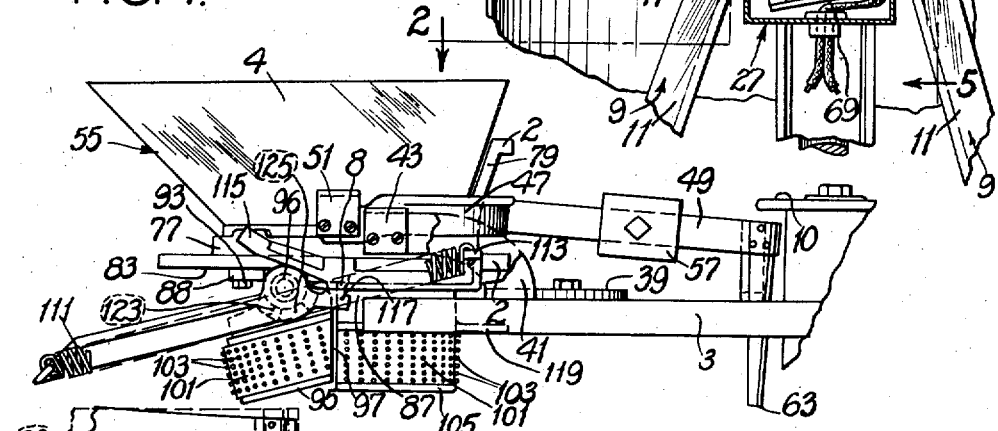
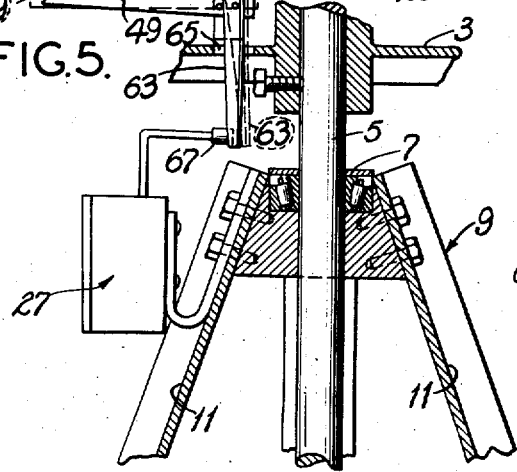

Feb. 25, 1936.　　　B. A. HANNEWALD ET AL　　　2,031,708
APPARATUS FOR FILLING BAGS
Filed Jan. 3, 1933　　　3 Sheets-Sheet 3

Burton A. Hannewald,
Edward Ingstad,
Inventors.
Delos G. Haynes
Attorney.

Patented Feb. 25, 1936

2,031,708

UNITED STATES PATENT OFFICE 2,031,708

APPARATUS FOR FILLING BAGS

Burton A. Hannewald and Edward Ingstad, Indianapolis, Ind., assignors to Bemis Bro. Bag Co., St. Louis, Mo., a corporation of Missouri Application January 3, 1933, Serial No. 649,928

4 Claims. (Cl. 249—55)

This invention relates to apparatus for filling or packing bags and the like, and with regard to certain more specific features, to such apparatus which shall also perform weighing functions.

Among the several objects of the invention may be noted the provision of apparatus for filling or packing bags and the like with vegetables, fruit and like produce, wherein accurate, checked weight may be quickly obtained; and the provision of apparatus of the class described which shall be light in weight and therefore portable and which is simple in construction, operation and adjustment. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a top plan view of the apparatus, parts being broken away to show certain otherwise hidden features;

Fig. 2 is a horizontal section taken on line 2—2 of Fig. 3, parts being broken away for clarity;

Fig. 3 is an enlarged, partial section taken on line 3—3 of Fig. 1;

Fig. 4 is a view similar to Fig. 3 showing the weighing mechanism ready to receive a bag;

Fig. 5 is an enlarged, vertical, sectional detail illustrating an automatic starting mechanism;

Fig. 8 is a side elevation of a motor drive and friction brake therefor; and,

Similar reference characters indicate corresponding parts throughout the several views of the drawings.

Figure 6:
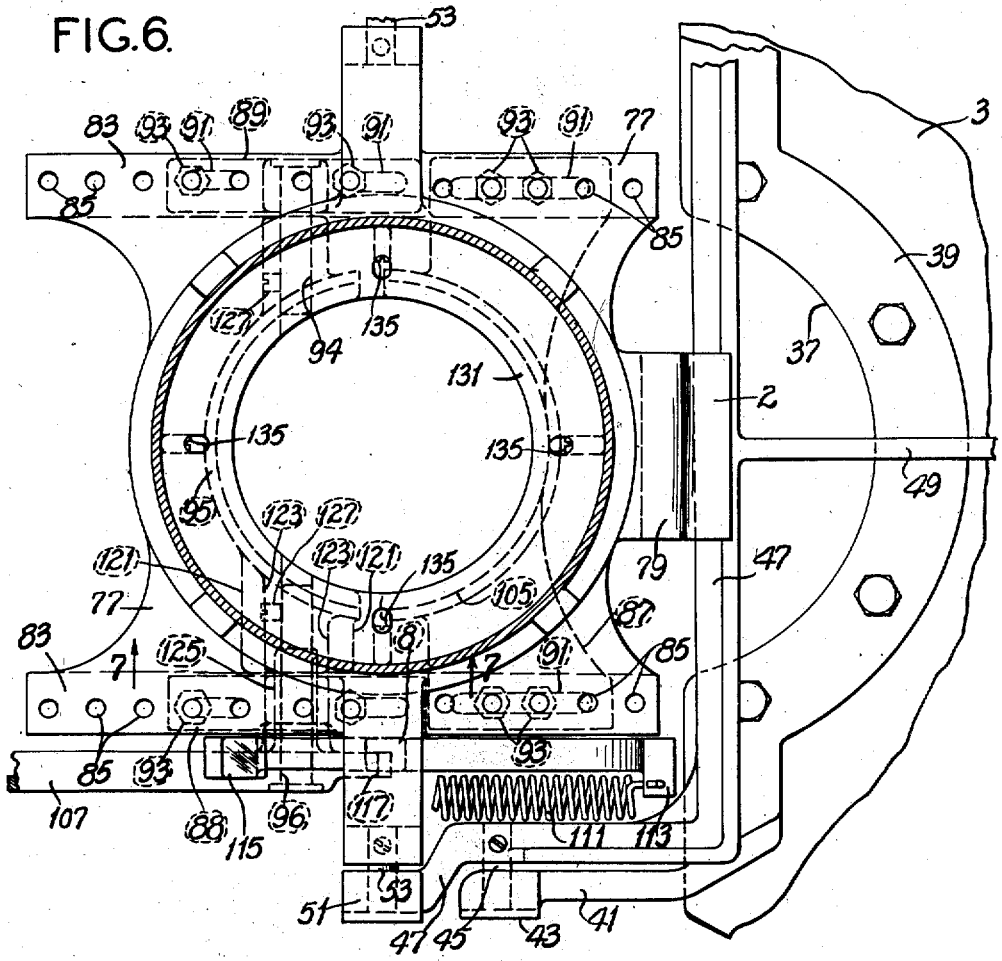
Fig. 6 is an enlarged, horizontal section taken on line 6—6 of Fig. 3 and showing an interior adapting ring in position, the latter not being shown in Fig. 1.

Referring now more particularly to Fig. 1, there is shown at numeral 1 a chute from a grading table or picking belt from the end of which chute 1 drop articles to be filled or packed in bags, such as vegetables, fruit and nuts or the like.

At numeral 3 is shown a horizontal spider or table 3, carried upon a vertical supporting shaft 5 (Figs. 3 and 5), the shaft 5 passing through and being supported within an upper bearing 7 of a pyramidal frame 9. The frame 9 comprises standards 11, as shown, through the bases of which are provided set screws 13 for leveling purposes.

Two of the supports 11 carry lateral bearings 15 for journaling rollers 17, the purpose of which rollers 17 is to have the machine as a whole tilted thereon for movement from place to place (Fig. 2). It will be understood that the rollers 17 do not touch the ground when the machine is horizontal, but do so when the machine is tilted over on the rollers 17. A pair of operating handles may be attached and detached to the leg of the machine, if desired, when moving the same.

The shaft 5 near its lower end carries a gear 19 (Figs. 2 and 8), by means of which said shaft 5 is driven. The gear meshes with a driving pinion 21, the latter being driven from a motor 23 by way of a speed reducer 25. The motor is energized from a suitable circuit through a mercury switch 27.

A friction, band brake 29 associated with a pulley 31 on the armature shaft of the motor 23 serves, after current has been shut off, to limit the coasting movement of the motor and the elements driven thereby. The brake 29 has a reacting spring tensioning member 32 and a coacting adjustment bolt 33, the latter being adjustable by means of a wing nut 35. Hence, the frictional force exerted by the brake may be varied to compensate for wear or to meet varying retarding conditions.

The spider 3 has a generally polygonal shape with a number of edges corresponding to the number of filling-and-weighing units that it is desired to have upon a machine and, in the present example, the number of said units is six. Thus the spider 3 is, generally speaking, hexagonal in the present example. The hexagonal edges of the spider 3 are notched, as indicated at numeral 37, and adjacent the notched portions are fastened yokes 39 having extending arms 41 providing bearings 43 for knife edged trunnions 45, the latter forming extensions from yokes 47 of beams 49 (Figs. 1, 3, 4 and 6).

The beams 49 at their outer ends are likewise provided with bearings 51 for knife edged trunnions 53, the latter extending from ring supports 77 within which are held hoppers 55. The ring supports 77 are prevented from assuming too great a swing with respect to the beams 49 by upper and lower stops 2 on the supports 77 and engageable with the beams.

Rearwardly the beams 49 extend toward the center of the machine and are provided with sliding adjustable counterweights 57. Each counterweight 57 carries a small riding weight 59 which may be adjusted by means of a screw 61. By adjusting the main weights 57 on the beams and the small rider weights 59 on the main weights, accurate weighing may be determined.

Centrally of the machine said beams 49 carry downward extensions or fingers 63 which pass through openings 65 in the spider 3 (Figs. 3, 4 and 5). The beams 49 being movable on their trunnions 45, it will be clear that said extensions 63 may assume upward and downward position (Fig. 5).

When in the dotted-line positions, said extensions 63 are adapted to clear an operating arm 67 of said switch 27 and when in downward positions to engage said arm. The rotation of the spider 3 (under operation of said motor 23) is such that when the arm 67 is engaged by one of said extensions 63, the mercury tube element 69 of said switch 27 is moved counterclockwise (Fig. 3) to disengage the mercury 71 therein from the contacts 73 in the tube 69, thus breaking the motor circuit. The angle of swing of the arm 67 and the adjustment of the friction brake 29 is such that the forward motion of the spider 3 is stopped at the proper time. Thus, as long as the respective engaging arm 63 is in downward position, and in contact with the arm 67, the motor circuit is opened and rotation almost immediately ceases.

If the respective downward extension 63 be lifted to clear, as shown in dotted lines of Fig. 5, the tube 69 of the switch gravitationally descends (the center of gravity being below its pivot point), carrying the arm 67 clockwise from behind the extension 63 (Fig. 3) thus reclosing the circuit to cause the motor to advance the supporting spider 3. Rotation will continue until the next depressed extension 63 contacts the arm 67 to rotate counterclockwise and thus to break the motor circuit. As will be shown, the extensions 63 are depressed as long as no bags are applied to the respective hopper outlet, or as long as bags so fastened are not filled to proper weight.

Referring to the hoppers 55, it will be seen that they comprise metal, quadrilateral hopper portions 4 thickly lined with soft, sponge or like rubber 75. This rubber effectively prevents bruising of the products being packed. The quadrilateral shapes are adjacently arranged to provide spaces therebetween which spaces are small enough to prevent substantial spilling of material, even though the machine advances while material continues to flow from the point 1. Each hopper 55 is set into its ring-shaped casting 77 and held by suitable means.

On the under side of the casting 77 are formed spotting surfaces 83 having series of bolt holes 85 therein for adjustably applying movable members 87, 88 and 89. The members 87, 88 and 89 are slotted as indicated at numerals 91 for permitting application of holding bolts 93 and for effecting minor adjustments which are less than the distances between successive bolt holes 85 (Fig. 6).

The rearward fixed members 87 include downwardly extending, semi-circular, hollow, cuff-shaped jaws 105, these being provided with exterior rubber facings 101 having protrusions 103 for the purpose of frictionally holding a bag mouth. The jaws 105 are stationary. It will be seen that the jaw cuffs 105 are fixed with respect to the castings 77 which support the hoppers 55.

The outwardly located members 88 and 89 form bearings for trunnions 96 and 94 of outwardly located, movable cuff-shaped jaw members 95. These cuff-shaped jaw members are cylindric but are beveled endwise as at 97 so that they may assume an approximately conic form in conjunction with the inward, fixed jaw members 105 (Fig. 4). A cylindric association between a fixed jaw 105 and movable jaw 95 is shown in Fig. 3. The lower ends 99 of the jaws 95 are provided with exterior rubber facing bands 101 having protrusions 103, also for increasing friction within the mouths of bags. Beading at the bottoms of the jaws aid their holding action on small bags.

In order to swing the jaws 95, each one of the trunnions 96, beyond its point of bearing in its member 88, rotatably carries an arm 107 having an endwise hand plate 109, and is held in either one of two over-centered positions (Figs. 3 and 4), this being effected by means of a spring 111, said spring being tensioned by a fastening to a lug 113. The lug 113 forms an extension from the casting 77. Another extension 115 functions as a stop for the arm 107 when no bag is applied over the jaws 95, 105 and when said arm is upwardly overcentered. Downwardly, a stop 8 is contacted by a contact lug 117 on the arm 107. The stop 8 also forms an extension from the member 77. The stop 115 permits greater overcentering of arm 107 than does stop 8.

Figure 7:
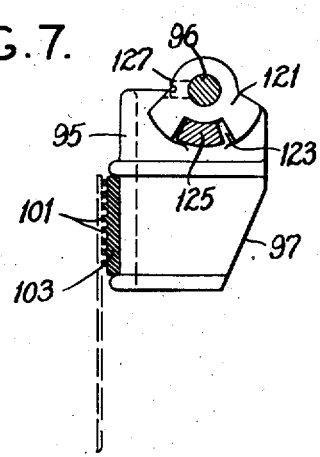
Fig. 7 is a vertical section taken on line 7—7 of Fig. 6 showing a detail.
Figure 9:
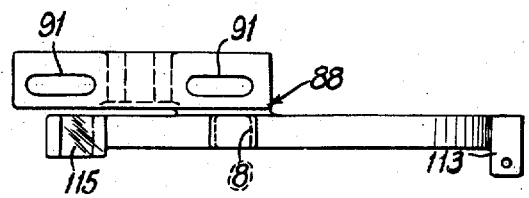
Fig. 9 is a plan view of certain parts of an over-centering mechanism.

The swinging movement of the arm 107 is transmitted with lost motion to the jaw 95. The jaw 95 has formed integrally therewith a lug 121 having a notched portion 123 (Fig. 7). It will be understood that the jaw 95 and the sector 121 (an integral assembly) are fastened to the trunnion 96 by means such as the set screw 127 shown in Fig. 7, but that the arm or lever 107 is rotatable on said trunnion 96. The trunnion 96 rocks in its bearing in the adjustable member 88. The lever 107 carries an extension 125 which passes under member 88 and extends into said notch 123 of lug 121. The angular opening of the notch 123 is greater than the arcuate width of the lug 125. Thus lost motion is introduced between the action of the lever 107 and that of the jaw 95. This lost motion is introduced to allow the lever 107 to move through an angle which is greater than that through which the jaw 95 moves, thus increasing the effective moment of the spring 111 when holding a bag (lever 111 up), and conversely to reduce the moment upon initial movement (lever 111 down). As the spring 111 snaps the lever 107 over dead center, the lug 125 engages the left-hand end of the notch 123 (Fig. 7) to snap the jaw 95 from the position of Fig. 4 to the position of Fig. 3 wherein it stretches and holds a bag mouth placed over the jaws. This feature permits of easy operation of the lever 107 up to dead center, and thereafter effective, automatic stretching of the bag mouth is effected by spring-driven, outward movement of the jaw 95.

Reverse and downward pressure on the lever 107 results in pressing it over dead center, the spring drawing it into the position shown in Fig. 4 and thus causing the lug 125 to engage the right-hand end of the notch 123 to rotate the jaw 95 counterclockwise from the holding position of Fig. 3 to the releasing position of Fig. 4, thereby releasing any bag, the mouth of which the jaws 95, 105 had theretofore been within. A stop 119 at the upper end of each rearward jaw 105 limits the bag movement in placing the bags over the substantially conical jaw arrangement (Fig. 4) and provides the point at which metal may be subtracted or added by welding, bolting or otherwise, in order to balance the casting 77 and associated parts on the trunnions 53.

In Fig. 6 the jaws 95 and 105 are shown as having a radius curvature which is less than that of the inside bore of the casting 77. In order to properly guide the material being packed an adapter ring 131 is held within the lower end of each hopper 55, this being done by means of set screws 135. It will be understood that when the jaws 95, 105 are adjusted into a position beneath the member 77 sufficiently to accommodate larger bags, an adapter ring may be substituted having a larger opening, or it may be dispensed with entirely where the jaws are positioned exteriorly of the downward projection of the opening of the hopper.

When the jaws 95 and 105 are adjusted to take up positions outside the hopper mouths (adapter rings 131 being dispensed with), it may be desirable to choose jaws 95, 105 whose radii of curvature are larger. This may readily be done by providing castings 87, 95, 105 with such radii of curvature. This involves, in the case of the rearward jaw 105, merely unbolting the casting 87 by loosening the bolts 93 and making a substitution. In the case of the forward jaw 95, it merely means a removal of set screws 127 and the replacement of a suitable jaw 95 on the trunnions 93 and 94, and outward adjustment of the bearings 88 and 89.

In order that filled sacks may be supported when released from the jaws 95, 105, an adjustable bench 137 and a side wall 139 are provided around such parts of the apparatus and beneath the weighing mechanism as are employed for the bag removal operation.

The operation of the device is as follows:

All arms 107 are assumed to be overcentered downwardly (Fig. 4) and the jaws are conically arranged. No filled bags are in position and thus the beam arms 49 are depressed at their inward ends. The switch arms 67 have been gravitationally rotated to a clockwise position and are not contacted by any of the arms 63. Thus the circuit is closed at switch 27. The weights 57, and their riders 59 have been adjusted for the net weight which is desired in the respective bags, tare being taken into account. The friction brake 29 is preliminarily adjusted.

A bag is applied at station X by opening the mouth thereof with the hands and placing the rear portion of the mouth over the rearward jaw 105, the stop 119 determining the elevation of the bag. The bag mouth was then drawn over the conically arranged swinging cup 95 (Fig. 4) and drawn up. This upward drawing of the bag places the hands of the operator adjacent to the plate 109 and a slight wrist movement causes the arm 107 to reach dead center position after which the spring 111 causes further overcentering and movement of the jaw 95 to substantially the position of Fig. 3 thereby expanding the mouth of the bag and holding it in position on the rubber faced cup. The mechanical operating arrangement on the overcentering mechanism is such that when the jaws are in the contracted position only a small pressure of motion is required to the operator in order to put the jaws into the operating position. The operating lever is so located that the bag can be held with the two hands of the operator, operating lever 107 moved by the wrist.

As soon as the motor circuit is energized, by means of a line switch other than the switch 27 which is at this time closed, the spider 3 is driven clockwise, viewing it from above (Fig. 1). The machine is related with respect to the chute 1 so that when the first arm 63 strikes the switch handle 67 (Fig. 5) and the switch 27 is opened, the band brake 29 immediately brings the mechanism to a stop and such that one of the hoppers 55 is brought beneath the chute 1. Produce is then caused continuously to flow down the chute 1. Bags are repeatedly applied at station X.

As the produce flows down the chute 1 and into the hopper 55 positioned thereunder, the bag held below the hopper fills. An operator standing at station Y notes when the respective beam 49 gets into a critical state, as when the amount of produce in the respective bags begins to counterbalance the effect of the weight 57.

It is one of the features of the present invention that the operator does not wait until the beam arm 49 is definitely lifted, thus indicating that too much produce is in the bag. Heretofore, this has been the method pursued in analogous weighing operations, produce then being removed from the bag at a successive position thereof for determining proper weight.

We have found that it is better not to permit the weight to become too much and then to remove some, but to cause the machine to advance before the weight is enough and then add produce at a station such as Z, until the correct balance is obtained. This has the advantage of increasing the speed of operation of the device. When produce is added at station Z, that operation takes place of, or constitutes a check weighing. Heretofore, when too many articles were permitted to flow in, a large number were removed and then some thrown back to effect a final weighing. The operation of removing articles is hereby dispensed with.

In order that the machine may advance when the beam 49 under the chute 1 becomes critical in its action, the operator places his hand upon the respective hopper 55 and depresses the same until the inner end of the respective beam 49 strikes a central limiting stop 10. This causes the respective beam arm 49 to lift and thus to cause the extension 63 thereof to clear the switch arm 67. The switch swings clockwise under the action of gravity and closes to restart the motor which drives the apparatus ahead until the next hopper 55 which has by this time had a bag applied thereto, advances to a position beneath the chute 1, its beam extension 63 engaging the switch arm 67 to open the switch 27 and the device stopping as above described.

It will be understood that if for some reason it be not desirable to practice the invention above outlined, produce may be permitted to flow into the bags until slight overweight is allowed to raise the beams 49 and thus cause reclosing of the switch and advance of the mechanism, a check weighing being subsequently effected by manually removing produce from the bags.

A filled bag on its respective set of jaws 95, 105 is carried around to a position over the bench 137, said bench being adjusted to slightly clear the bottom of the bag, the wall 139 clearing it rearwardly.

The operator at or near station "Z" removes the bag by pressing down the lever 107, thus overcentering it and causing it to drive the jaw 95 inwardly to the Fig. 4 position, thus releasing the bag which drops to the platform or bench 137. The filled bag may from here be removed for subsequent closing.

The weighing mechanism, being relieved of its loaded bag, has its beam 49 settle back so that the extension 63 is in position to make a subsequent stop. A bag is repositioned at or before the station X, ready for the next filling.

Among the advantages of the invention may be noted the fact that the overcentering mechanism for opening the jaws is arranged to be operated upon the natural upward movement of the wrist while the hands are applying a bag mouth to the jaws. No constricting resistance of the bag mouth is applied to movement of the lever 107 until the same is overcentered. Thus, an operator does not encounter any but constant spring resistance at the lever 107, and this is slight because the downward overcentering advantage of the spring 111 is slight.

It will be noted in the above connection that the overcentering action of the spring is less downwardly (Fig. 4) than the overcentering action upwardly (Fig. 3). The purpose of this is to provide easy action upon the upwardly throw and a positive holding by the spring 111 after overcentering so that the bag is effectively supported. Manual overcentering downwardly is aided by the constricting action of the mouth of the bag over the jaws 95 and 105. Furthermore upon release no bag needs to be held in position as a manual action is accomplished. The bag is merely permitted to drop on the bench 137 as it is held by the left hand and thus the right hand is free for substantially pressing the plate 109.

It will be understood that very slight frictional braking action is required in the brake band, in view of the fact that the brake effect has a mechanical advantage with respect to the driven parts of the apparatus. This is because the gear reducing mechanism is interposed between the brake 29, and the parts having the momentum. Thus, the holding action of the brake on the motor while the motor is running is negligible, there being no device providing a mechanical advantage between the brake and the motor itself, such as is provided between the brake and the parts having the momentum.

The levelling and transporting feature assures that the device may be transported to and properly adjusted in various locations in the field.

The bags are held on the outside of the operating jaws, thus extending the bags as much as possible so that the flow of the material will not be restricted. The jaws and adapters being of various sizes and interchangeable on the device, together with the fact that the members on which the jaws are held are adjustable, provides means for accommodating a wide range of bag sizes.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:
1. In weighing apparatus, a support, a plurality of weighing means mounted on said support, elements movable by said weighing means upon the determination of a predetermined weight and returnable after the weight is removed, an automatically returnable switch engageable by said elements when the weight is subnormal, a motor drive for the support including a circuit, said switch controlling said circuit to stop the motor when the weight is subnormal and to automatically again start the motor when said weight reaches the predetermined amount, and frictional braking means determining the point of stopping of the support.

2. In automatic weighing apparatus, a support, a motor driving said support, a speed reducer in the drive between the motor and the support, said support carrying a plurality of weighing means, an automatically reclosing switch controlling the motor circuit, extensions from the weighing means movable upon a predetermined weight being applied to the weighing means, said extensions being engageable with the switch to open the motor circuit under subnormal weight conditions and during advancing movement, and otherwise to disengage the switch whereby the same recloses the motor circuit to effect further advancing movement, and continuous braking means associated with the motor for limiting movement of the support after said switch breaks said circuit, said speed reducing device being located in said drive at a point between the said braking means and the support.

3. In automatic weighing apparatus, a support, a motor for driving said support, a speed reducer in the drive between the motor and the support, said support carrying a plurality of weighing means, a switch controlling the motor circuit, extensions from the weighing means movable upon a predetermined weight being applied to the weighing means, said extensions being engageable with the switch to open the motor circuit under subnormal weight conditions and advancing movement, and upon otherwise proper weight to disengage the switch whereby the same recloses the motor circuit to effect an advancing movement, and continuous braking means associated with the motor for limiting movement of the support after said switch breaks said circuit, said speed reducing device being located in said drive at a point between the said braking means and the support.

4. In a bag holding and filling apparatus, a relatively stationary support, a shaft mounted for rotation on said support, a head mounted on said shaft for rotation therewith and a plurality of radially disposed, circumferentially spaced bag holding devices carried by the head, each device comprising a swingably mounted adjustable scale beam having a finger on one end and having a bag holder at the opposite end, the finger moving in one direction upon application of weight to the holder and in the reverse direction upon removal of said weight, a driving motor for the shaft and switch means for cutting out the driving motor upon being contacted by said finger and cutting in the driving motor when the movement of the finger is reversed to avoid contact with the switch, and means whereby the shaft and head may be freely rotated at any angular position thereof.

BURTON A. HANNEWALD.
EDWARD INGSTAD.